Jan. 13, 1925.

C. D. PLATT 1,522,649

TERMINAL

Filed Oct. 7, 1920

Inventor
C. D. Platt
By his Attorneys

Patented Jan. 13, 1925.

1,522,649

UNITED STATES PATENT OFFICE.

CLARENCE D. PLATT, OF BRIDGEPORT, CONNECTICUT.

TERMINAL.

Application filed October 7, 1920. Serial No. 415,226.

*To all whom it may concern:*

Be it known that I, CLARENCE D. PLATT, a citizen of the United States of America, residing at Bridgeport, Connecticut, have invented a new and useful Terminal, of which the following is a specification.

My invention relates to means for making temporary electrical connections.

It is an object of my invention to provide a cheap, serviceable and efficient terminal having means for making both permanent and temporary connections.

My invention in its preferred form includes a wire lug terminal having a support15 ing portion and a socket or contact for receiving a wire, integral with or secured to said supporting portion. Projecting from one of the members, preferably the socket, is a projection or projecting fin for receiving a temporary connecting element or clip.

In the drawings, which show merely a preferred form of my invention—

Figure 1:
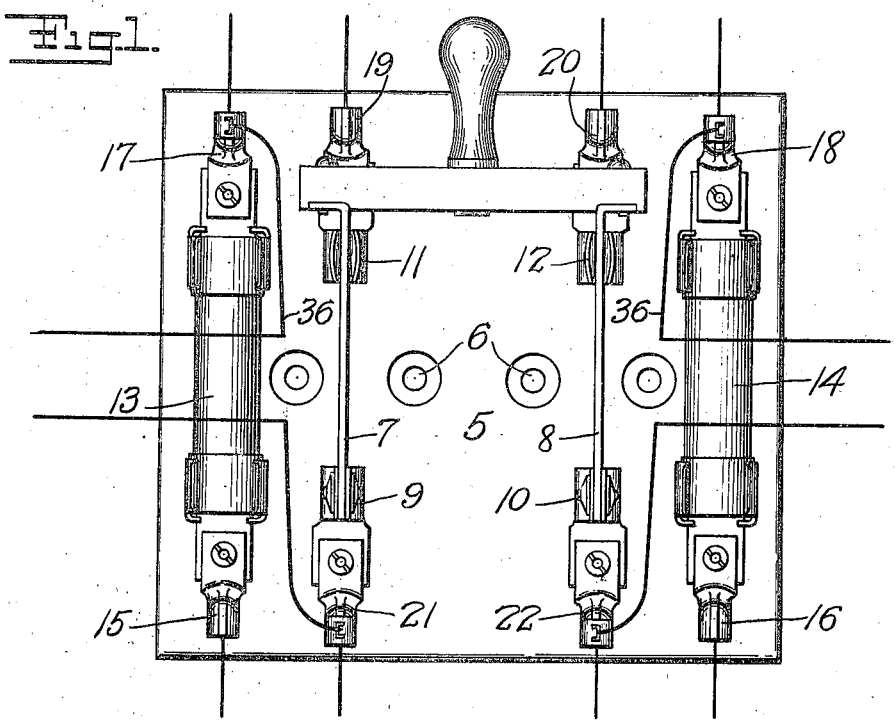
Fig. 1 is a view illustrating my invention as applied to a meter testing switch;

In said drawings, 5 indicates any desired or usual switch base having means, such as the apertures 6, for securing the same to a support. 7, 8 indicate the usual blades of a double-pole switch pivoted to the base at 9, 10. 11, 12 indicate contact jaws for receiving the movable blades 7, 8. 13, 14 are fuses interposed between the main line terminals 15, 16 and the meter terminals 17, 18. 19, 20 indicate other meter terminals, and the load line terminals are indicated at 21, 22.

Switches of this class are usually con45 nected with a meter and when it is desired to test the meter a temporary connection may be made between the main line and the load line in order that the customer's service may not be interrupted while the meter is being tested and the switch may then be opened to disconnect the terminals 19, 20 from the load line terminals 21, 22.

I have shown, somewhat diagrammatically a means for making temporary connections between the terminals 17 and 21, and between the terminals 18 and 22. The means for making or permitting these temporary connections constitutes the principal feature of my invention.

23 indicates the usual supporting portion for a wire lug terminal. An aperture 24 may be provided therein, to receive a screw for attaching the base to a support. Integral with or secured to the portion 23 is a means for receiving a permanent connection, which, in the form shown, is a socket 25, in which a wire may be secured, as by means of solder. Projecting from one of the terminal parts, preferably the socket, is a fin or projection 26, of suitable size and proportions for receiving a temporary connecting element or clip.

Figure 2:
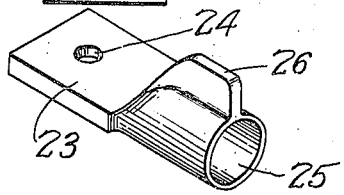
Fig. 2 is an enlarged detail perspective view of a terminal embodying my invention.
Figure 4:
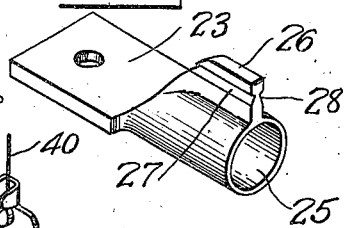

In the form of terminal shown in Fig. 4 the supporting portion 23 and socket 25 may be the same as corresponding elements in Fig. 2. In Fig. 4, however, the fin 26 is provided with means which, in the embodiment shown, are in the form of one or more depressions or grooves 27, 28, for providing a firmer hold for a temporary connecting clip.

The terminal shown in Figs. 2 and 4 may be conveniently formed by casting.

Figure 3:
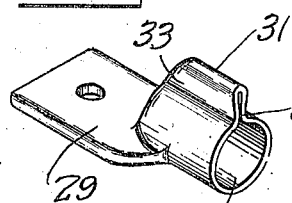
Figs. 3 and 4 are similar views illustrating modified forms.

In Fig. 3 is shown a terminal which may be made of tubing, which is common practice in this art. The supporting portion 29 is provided with the socket 30, as in the previous forms. The blank or tube for the socket may be made considerably larger than is desired for the finished socket, and parts of the tube are crimped or bent together to form the fin or projection 31. In the form shown the parts of the fin are not bent into contact with each other at the extreme upper edge, but contact with each other adjacent the upper edge of the socket, as at 32. This construction provides means in the form of a depression 33 at each side of the fin for more securely holding the clip in contact with the fin and preventing disengagement of the clip.

Figure 5:
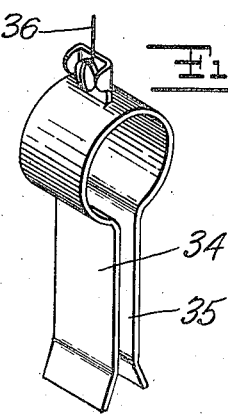
Figs. 5 and 6 are enlarged detail per30 spective views of temporary connecting elements or clips.

In Fig. 5 is shown a temporary spring connecting clip having jaws 34, 35 and a wire 36 connected to the clip in any suitable manner.

In making a temporary connection to the terminals shown in Figs. 2, 3 and 4, the jaws 34, 35 of the clip are simply slipped over and engage with the projections or fins.

Figure 6:
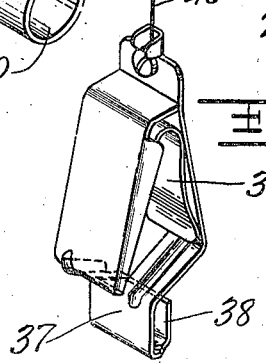

In Fig. 6 is shown a clip having the jaw portions 37, 38 crossed and held in contact with each other by means of a spring 39, and a wire 40 is connected to the clip. In using this form of clip the outer sides are compressed and the jaws 37, 38 opened to permit passing over the projections or fins on the terminals. It should be understood that the usual form of rubber nipple or covering will be provided for the temporary connecting clips.

The switch shown in Fig. 1 is provided with terminals embodying my invention. When it is desired to make temporary connections, for example, to connect the terminals 17 and 21 to each other or to testing instruments for example, it is necessary merely to provide a wire 36 with clips, for instance, as shown in Fig. 5. The clips are slipped over and engage the fins on the terminals and provide a positive electrical connection.

The switch shown is merely to illustrate a commercial, practical embodiment of my invention, and I wish it to be understood that terminals embodying my invention may be used wherever temporary connections are to be made.

While I have shown specific forms of my invention, I wish it to be understood that various changes and modifications may be made, all within the scope of the appended claims.

I claim:

1. A one-piece wire lug terminal, comprising a perforated supporting portion, a wire receiving socket member, and a fin contact projecting therefrom, said fin contact being adapted to receive temporary electrical connection and having a depression therein for receiving said temporary electrical connection.

2. A one-piece wire lug terminal, comprising a flat supporting portion having means for connecting said supporting portion to a support, an integral tubular socket extending from said supporting portion for receiving a wire and making a permanent connection, and an integral contact fin projecting from said tubular socket for receiving a temporary connecting clip.

CLARENCE D. PLATT.